United States Patent
Carlemalm (10) Patent No.: US 11,216,817 B2
(45) Date of Patent: Jan. 4, 2022

(54) GENERATION AND VERIFICATION OF A TEMPORARY CARD SECURITY CODE FOR USE IN CARD BASED TRANSACTIONS

(71) Applicant: No Common Payment AB, Stockholm (SE)

(72) Inventor: Fredrik Carlemalm, Stockholm (SE)

(73) Assignee: No Common Payment AB, Stockholm (SE)

( * ) Notice: Subject to any disclaimer, the term of this patent is extended or adjusted under 35 U.S.C. 154(b) by 40 days.

(21) Appl. No.: 16/328,515

(22) PCT Filed: Aug. 24, 2017

(86) PCT No.: PCT/SE2017/050858
§ 371 (c)(1),
(2) Date: Feb. 26, 2019

(87) PCT Pub. No.: WO2018/044221
PCT Pub. Date: Mar. 8, 2018

(65) Prior Publication Data
US 2020/0294058 A1    Sep. 17, 2020

(30) Foreign Application Priority Data
Aug. 30, 2016  (SE) .................. 1651165-1

(51) Int. Cl.
*G06Q 20/40*    (2012.01)
*G06F 21/34*    (2013.01)
(Continued)

(52) U.S. Cl.
CPC ......... *G06Q 20/4018* (2013.01); *G06F 21/34* (2013.01); *G06Q 20/3223* (2013.01);
(Continued)

(58) Field of Classification Search
CPC ............. G06Q 20/385; G06Q 20/3223; G06Q 20/4018; G06Q 20/409; G06Q 20/341; G06F 21/34; H04W 12/004
See application file for complete search history.

(56) References Cited

U.S. PATENT DOCUMENTS 7,743,200 B1   6/2010  Panwar et al.
8,364,594 B2   1/2013  Hammand
(Continued)

FOREIGN PATENT DOCUMENTS

EP        2026266        2/2009
JP    2011-248778 A     12/2011
(Continued)

OTHER PUBLICATIONS

S. Golovashych, "The Technology of Identification and Authentication of Financial Transactions. From Smart Cards to NFC-Terminals," 2005 IEEE Intelligent Data Acquisition and Advanced Computing Systems: Technology and Applications, 2005, pp. 407-412, doi: 10.1109/IDAACS.2005.283013. (Year: 2005).*
(Continued)

*Primary Examiner* — Bruce I Ebersman
*Assistant Examiner* — Steven R Chism
(74) *Attorney, Agent, or Firm* — Knobbe, Martens, Olson & Bear, LLP (57) ABSTRACT

The present disclosure presents a method for a card based transaction between a mobile terminal and a service provider system having one or several computer servers. The mobile terminal obtains a CSC from credit card/debit card. The mobile terminal obtains a data seed. The mobile terminal applies a minimal perfect hash function to the CSC as well as the data seed to generate a temporary CSC. The mobile terminal initiates a card based transaction with the service provider system utilizing the generated temporary CSC. The
(Continued)

service provider system obtains the temporary CSC and applies a same minimal perfect hash function to the temporary CSC until a match is found between the obtained temporary CSC and one CSC stored at the service provider system. In response to a match the service provider system continues the initiated card based transaction with the mobile terminal.

20 Claims, 8 Drawing Sheets

(51) Int. Cl.
    *G06Q 20/32*     (2012.01)
    *G06Q 20/34*     (2012.01)
    *G06Q 20/38*     (2012.01)
    *H04W 12/40*     (2021.01)

(52) U.S. Cl.
    CPC ......... *G06Q 20/341* (2013.01); *G06Q 20/385* (2013.01); *G06Q 20/409* (2013.01); *H04W 12/40* (2021.01)

(56) References Cited

U.S. PATENT DOCUMENTS

| | | | |
|---|---|---|---|
| 9,033,218 B1 | 5/2015 | Batra | |
| 9,183,480 B1* | 11/2015 | Quigley | ............... G06Q 20/385 |
| 10,438,198 B1 | 10/2019 | Griffin et al. | |
| 10,523,664 B2* | 12/2019 | Li | ......................... H04L 9/3228 |
| 2003/0191945 A1 | 10/2003 | Keech | |
| 2008/0029593 A1 | 2/2008 | Hammad et al. | |
| 2008/0077798 A1 | 3/2008 | Nachtigall | |
| 2010/0266120 A1 | 10/2010 | Leggette et al. | |
| 2011/0270757 A1 | 11/2011 | Hammad | |
| 2012/0031969 A1 | 2/2012 | Hammad | |
| 2012/0143754 A1 | 6/2012 | Patel | |
| 2012/0143768 A1 | 6/2012 | Hammad et al. | |
| 2012/0191615 A1* | 7/2012 | Schibuk | ................ H04L 9/3239 705/75 |
| 2013/0008956 A1 | 1/2013 | Ashfield | |
| 2013/0036027 A1 | 2/2013 | Walker et al. | |
| 2013/0103591 A1* | 4/2013 | Wheeler | ............. H04L 63/0838 705/64 |
| 2014/0040139 A1* | 2/2014 | Brudnicki | ......... H04W 12/0471 705/44 |
| 2014/0067683 A1* | 3/2014 | Varadarajan | ........... G06Q 20/04 705/44 |
| 2014/0358777 A1* | 12/2014 | Gueh | ................. G06Q 20/1085 705/43 |
| 2015/0169467 A1 | 6/2015 | Chase et al. | |
| 2015/0371234 A1* | 12/2015 | Huang | .................. G06Q 20/20 705/44 |
| 2016/0180343 A1 | 6/2016 | Poon et al. | |
| 2017/0004506 A1 | 1/2017 | Steinman et al. | |

FOREIGN PATENT DOCUMENTS

| | | |
|---|---|---|
| WO | WO 2007/076476 A2 | 7/2007 |
| WO | WO2009/039600 | 4/2009 |
| WO | WO 2015/126753 | 8/2015 |
| WO | WO 2015/126753 A1 | 8/2015 |
| WO | WO 2018/044221 | 3/2018 |
| WO | WO 2018/044221 A1 | 3/2018 |

OTHER PUBLICATIONS

Supplementary European Search Report for Europe Application No. EP 17 84 7093 dated Dec. 17, 2019.

Bothelho, F.C. et al., "Perfect hashing for Data management Applications" Feb. 2007, UFMG—ICEX, Departamento De Ciência Da Computação, Universidade Federal De Minas Gerais, RT.DCC.002/2007.

International Search Report for PCT/SE2017/050858 dated Nov. 24, 2017.

* cited by examiner

```
  3 1 0    1 5 0 9    8 7 6 5    4 3 2 1   IMSI (e.g., U.S.)
  2 4 1 9    0 7 5 6   Time stamp (minutes)
  6 4 8 2   CSC (4-digit, e.g. AMERICAN EXPRESS)
```

Figure 5A

```
   3 1 0
 1 5 0 9
 8 7 6 5              IMSI (e.g., U.S.)
 4 3 2 1

2 4 1 9
 0 7 5 6              Time stamp (minutes)

8 0 8 0              Sum of 4-digit parts of IMSI and time stamp.
                      Data seed is the last 4 digits of the sum.
```

Figure 5B

```
 8 0 8 0    Data seed (4-digit)
 6 4 8 2    CSC (4-digit, e.g. AMERICAN EXPRESS)
 4 5 6 2    Sum of 4-digit parts of data seed and CSC (the last 4 digits of the sum).
   ▼ Minimal Perfect Hash Function
 6 7 1 9
```

GENERATION AND VERIFICATION OF A TEMPORARY CARD SECURITY CODE FOR USE IN CARD BASED TRANSACTIONS

CROSS REFERENCE TO RELATED APPLICATIONS

This application is a U.S. National Phase Application of PCT International Application Number PCT/SE2017/050858, filed on Aug. 24, 2017, designating the United States of America and published in the English language, which is an International Application of and claims the benefit of priority to Swedish Patent Application No. 1651165-1, filed on Aug. 30, 2016. The disclosures of the above-referenced applications are hereby expressly incorporated by reference in their entireties.

TECHNICAL FIELD

The present disclosure generally relates to the field of card based transactions.

More specifically, the embodiments described herein relate to methods, mobile terminals and computer program for generating a temporary Card Security Code (CSC) for use in a card based transaction, e.g., with a service provider system. Also, embodiments described herein relate to methods and computer servers for verifying a temporary CSC used in a card based transaction.

The CSC may, for example, be a Card Verification Value (CVV), a CVV2, a Card Verification Code (CVC), a CVC2, a Card Validation Number (CVN), a CVN2, or a Card Identification Number (CID).

BACKGROUND

The banking industry has developed a type of "password" for use with cards such as credit and debit cards. This password typically takes the form of an authentication code (sometimes referred to as CSC) and is commonly referred to in the industry as a "card verification value" or "CVV". The CVV is formatted and used according to accepted industry standards. Initially, the CVV was an extra numeric string encoded on the magnetic stripe of credit and debit cards. More recently, an additional three-digit code has been printed on the backs, or rear side, of credit and debit cards. This printed code is commonly referred within the banking industry to as a "CVV2" code and the magnetically stored code is commonly referred to as a "CVV1" code. The printed code can, e.g., be requested and verified by merchants in transactions where the merchant has no other way of actually verifying that the customer has possession of the physical card. For example, in mobile transactions or in on-line transactions, the consumer may be prompted to enter the CVV2 code from the back of his or her card. The CVV2 code may provide some assurance that the consumer has possession of the physical credit or debit card, and has not simply obtained the card number and expiration date fraudulently. A printed CVV code is sometimes also referred to by consumers and on-line vendors as a "3-digit security code", "security code" or as "check digits".

SUMMARY

It is in view of the above background that the various embodiments disclosed herein have been made.

This disclosure recognizes that some existing solutions for card based transactions, and particularly mobile and on-line transactions, may still be inadequate. It is therefore a general object of the embodiments described herein to improve upon drawbacks in the existing art.

It is a general object of the embodiments described herein to enable improved card-based transactions that offer prevention, or at least complication, of unauthorized use of cards (e.g., credit or debit cards) by limiting access to accounts associated with said cards to unauthorized entities, processes and/or individuals.

This general object has been addressed by the appended independent claims. Advantageous embodiments are defined in the appended dependent claims.

In a first of its aspects, this disclosure concerns a method of generating a temporary CSC (such as a CVV or CVV2) for use in a card based transaction, e.g., with a service provider server. The method comprises: obtaining a CSC from a card such as a credit card or a debit card: obtaining a data seed: and applying a minimal perfect hash function to the CSC as well as the data seed to generate a temporary CSC. Advantageously, the method may further comprise initiating a card based transaction with the service provider system utilizing the thus generated temporary CSC.

In some embodiments, applying the minimal perfect hash function to the CSC as well as the data seed to generate the temporary CSC may comprise generating, or otherwise calculating, a total sum of the data seed and the CSC and, thereafter, applying the minimal perfect hash function to the thus generated total sum.

Typically, but not necessarily, the data seed may comprise an identifier which is common to a cardholder associated with said card and a service provider system.

In some embodiments, obtaining the data seed may comprise receiving a signal including the data seed from the service provider server.

Additionally, or alternatively, obtaining the data seed may comprise receiving a signal including the data seed from a card issuer server.

Additionally, or alternatively, obtaining the data seed may comprise retrieving the data seed from a Subscriber Identity Module (SIM) associated with a mobile terminal.

For example, the data seed may advantageously comprise any one or a combination of: a bank account number, an installation identifier, a mobile phone identifier such as an International Mobile Subscriber Identity (IMSI), and a time stamp.

In some embodiments, obtaining the CSC from the card may comprise optically reading the CSC from the card.

The method may, for example, be performed by a mobile terminal. The mobile terminal may be a device selected from the group consisting of: a mobile telephone, a tablet computer, a laptop computer, a desktop computer, and card terminal.

In a second of its aspects, this disclosure concerns a computer program comprising instructions which, when executed on a processor causes the processor to carry out the method according to the first aspect. A carrier comprising the computer program may also be provided. The carrier may for example be one of an electronic signal, an optical signal, a radio signal, or a computer readable storage medium.

In a third of its aspects, this disclosure concerns a method of verifying a temporary CSC (such as a CVV or CVV2) used in a card based transaction. The method comprises obtaining a temporary CSC, wherein the temporary CSC has been generated by previously applying a minimal perfect hash function to the CSC as well as a data seed; and, also, applying a same minimal perfect hash function to the temporary CSC until a match is found between the obtained temporary CSC and one CSC from a stored list of available CSCs. In other words, the same minimal perfect hash function as was used at the generation of the temporary CSC may be used.

This method may for example be performed by a service provider system having one or several computer servers and/or a credit issuer system having one or several computer servers.

In a fourth of its aspects, this disclosure concerns a computer program comprising instructions which, when executed on a processor causes the processor to carry out the method according to the third aspect. A carrier comprising the computer program may also be provided. The carrier may be one of an electronic signal, an optical signal, a radio signal, or a computer readable storage medium.

In a fifth of its aspects, this disclosure concerns a mobile terminal. The mobile terminal may comprise a user interface; a communications interface; one or more processors; and a memory storing instructions, executable by the one or more processors, whereby the mobile terminal is operative to perform the method of the first aspect.

The mobile terminal may be a device selected from the group consisting of: a mobile telephone, a tablet computer, a laptop computer, a desktop computer, and a card terminal.

In a sixth of its aspects, this disclosure concerns a server system having one or several computer servers. The server system may comprise a communications interface; one or more processors; and a memory storing instructions, executable by the one or more processors, whereby the service provider server is operative to perform the method of the third aspect.

In a seventh of its aspects, this disclosure concerns a method for a card based transaction between a mobile terminal and a service provider system having one or several computer servers. The method comprises: i) the mobile terminal obtaining a CSC from a card, such as a credit card or a debit card; ii) the mobile terminal obtaining a data seed; iii) the mobile terminal applying a minimal perfect hash function to the CSC as well as the data seed to generate a temporary CSC; and iv) the mobile terminal initiating a card based transaction with the service provider system; and v) the service provider system obtaining said temporary CSC; vi) the service provider server applying a same minimal perfect hash function to the temporary CSC until a match is found between the obtained temporary CSC and one CSC from a stored list of available CSCs; and, in response to a match having been found, the service provider system continuing the initiated card based transaction with the mobile terminal.

In an eighth of its aspects, this disclosure concerns a system for a card based transaction, the system comprising a mobile terminal and a service provider system including one or several computer servers. The mobile terminal is adapted to obtain a CSC from a card, such as a credit card or a debit card; obtain a data seed; apply a minimal perfect hash function to the CSC as well as the data seed to generate a temporary CSC; and initiate a card based transaction with the service provider system. Furthermore, the service provider server is adapted to: obtain said temporary CSC; and also apply a same minimal perfect hash function to the temporary CSC until a match is found between the obtained temporary CSC and one CSC from a stored list of available CSCs. Moreover, in response to a match having been found, the service provider system may be adapted to continuing the initiated card based transaction with the mobile terminal.

As will be appreciated, some embodiments described herein enable the generation of a temporary CSC, which is, as the name implies, valid only for a limited period of time. Furthermore, the hashed temporary CSC is uniquely associated with the original, or normal, CSC. Compared to the original, or normal, CSC, the temporary CSC is more difficult to obtain fraudulently. For example, if a purchase transaction occurs online, then generally the CSC from the back of the card is required as an added security measure to reduce fraud. Nevertheless, this CSC could e.g. be obtained fraudulently by an entity, process, or individual which/who is wrongly in possession of the card. By also adding the application of a minimal perfect hash function to the original, or normal, CSC as well as a data seed, it is made possible to generate a temporary CSC which is more difficult to obtain fraudulently. Since the temporary CSC is more difficult to obtain fraudulently, this temporary CSC may also be more secure to use in a subsequent card based transaction, such as a mobile or on-line purchase transaction.

As will also be appreciated, some embodiments described herein enable the verification of the above-mentioned temporary CSC. By applying the same minimal perfect hash function to an obtained temporary CSC until a match is found between the obtained temporary CSC and one CSC from a stored list of available CSCs, it is possible to verify the CSC without performing unnecessarily complex computations. In turn, this may allow for a relatively quick verification process.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout this description.

As described earlier, some existing solutions for card-based transactions may be inadequate. It is therefore a general object of the embodiments described herein to allow for improved card-based transactions that offer prevention, or at least complication, of unauthorized use of cards (e.g., credit or debit cards) by limiting access to accounts associated with said cards to unauthorized entities, processes and/or individuals. To address this, in accordance with an example embodiment, described herein are a method and a system for a card based transaction between a mobile terminal (e.g., a mobile telephone or a tablet computer) and a service provider system having one or several computer servers. For example, the mobile terminal may obtain a CSC from a card, such as a credit card or a debit card. Furthermore, the mobile terminal may obtain a data seed, which, in some embodiments, may include a time stamp and/or an identifier such as an IMSI. Still further, the mobile terminal may apply a minimal perfect hash function to the CSC as well as the data seed to generate a temporary CSC. Also, the mobile terminal may initiate a card based transaction with the service provider system utilizing the thus generated temporary CSC. Moreover, the service provider system may obtain said temporary CSC (e.g., by receiving the generated temporary CSC from the mobile terminal). Still further, the service provider system may also apply the same minimal perfect hash function to the temporary CSC at its end until a match is found between the obtained temporary CSC and one CSC from a stored list of available CSCs. In response to a match having been found, the service provider system may also continue the initiated card based transaction with the mobile terminal.

This may enable the generation of a temporary CSC, which is valid only for a limited period of time. Furthermore, the generated temporary CSC is generally uniquely associated with the original, or normal, CSC. Compared to the original, or normal, CSC, the temporary CSC is therefore comparatively more difficult to obtain fraudulently. For example, if a purchase transaction occurs online, then generally the CSC from the back of the card is required as an added security measure to reduce fraud. Nevertheless, this CSC could e.g. be obtained fraudulently by an entity, process, or individual which/who is wrongly in possession of the card. By also adding the application of a minimal perfect hash function to the original, or normal, CSC as well as a data seed, it is made possible to generate a temporary CSC which is comparatively more difficult to obtain fraudulently. Since the temporary CSC is more difficult to obtain fraudulently, this temporary CSC may also be more secure to use in a subsequent card based transaction, such as a mobile or on-line purchase transaction. Furthermore, a verification of the above-mentioned temporary CSC may be provided. By applying the same minimal perfect hash function to an obtained temporary CSC until a match is found between the obtained temporary CSC and one CSC from a stored list of available CSCs, it is possible to verify the CSC without performing unnecessarily complex computations. In turn, this may allow for a relatively quick verification process.

Prior to describing the embodiments of the present disclosure in more detail and in order to give context to these embodiments, hash functions will be described briefly. A hash function is any function that can be used to map data of arbitrary size to data of fixed size. The values returned by a hash function are typically called hash values, hash codes, hash sums, or simply hashes. The earlier-mentioned "temporary CSC" could thus be seen as a hash value. One use is a data structure called a hash table, widely used in computer technology for rapid data lookup. Hash functions typically accelerate table or database lookup by detecting duplicated records in a large file. A hash function may allow one to easily verify that some input data maps to a given hash value, but if the input data is unknown, it is deliberately difficult to reconstruct it (or equivalent alternatives) by knowing the stored hash value. This may be used for assuring integrity of transmitted data. A perfect hash function for a set S is a hash function that maps distinct elements in S to a set of integers, with no collisions. A perfect hash function has many of the same applications as other hash functions, but with the advantage that no collision resolution has to be implemented. In mathematical terms, it is a total injective function. Furthermore, a perfect hash function is generally order preserving if the keys in the key set are arranged in some given order and the hash function typically preserves this order in the hash table. A perfect hash function for a specific set S that can be evaluated in constant time, and with values in a small range, can be found by a randomized algorithm in a number of operations that is proportional to the size of S. Any perfect hash functions suitable for use with a hash table typically use at least a number of bits that is proportional to the size of S. A perfect hash function with values in a limited range can be used for efficient lookup operations, by placing keys from S (or other associated values) in a table indexed by the output of the function. Using a perfect hash function is best in situations where there is a frequently queried large set, S, which is seldom updated. This is because any modification of the set leads to a non-perfect hash function. As is known among persons skilled in the art, a minimal perfect hash function is a perfect hash function that maps n keys to n consecutive integers, usually [0 . . . n−1] or [1 . . . n]. Or said differently: Let j and k be elements of some finite set K. F is a minimal perfect hash function if and only if $F(j)=F(k)$ implies $j=k$ (i.e., an injective function) and there exists an integer a such that the range of F is $a \ldots a+|K|-1$. It has been proven that a general purpose minimal perfect hash scheme typically requires at least 1.44 bits/key. The best currently known minimal perfect hashing schemes appear to use around 2.6 bits/key.

Figure 1:
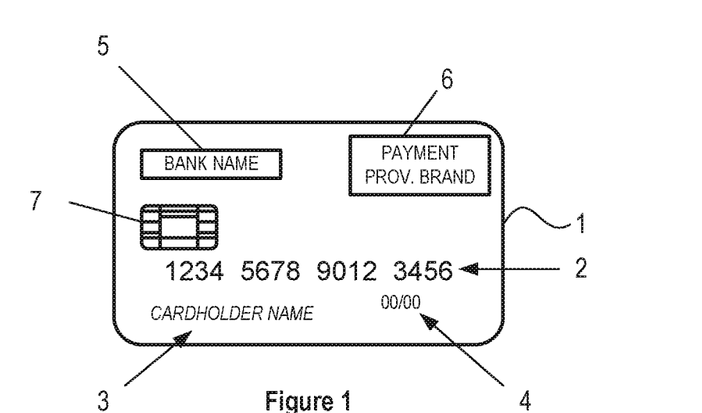
FIG. 1 schematically illustrates an example embodiment of a card such as a debit or credit card.

Referring now to FIG. 1, a card 1 such as a credit card or debit card that might be used with embodiments described herein will be described. The card 1 may be a plastic card having the size and shape of a conventional credit/debit card. Many conventional credit/debit cards are approximately 85.60×53.98 millimeters in size and are defined by the ISO/IEC 7810 standard as "ID-1". The card may be provided with raised card numbers 2, raised letters for a card holder name 3, raised numbers indicating the expiration date 4 (typically in the format MM/YY, where MM stands for month and YY stands for year). The card 1 also may include issuer information such as bank name 5, or bank logo. Typically, but not necessarily, the card 1 may also include information or a brand 6 of the payment provider, such as VISA, MASTERCARD or AMERICAN EXPRESS. Optionally, the card 1 may also include a chip 7 as is known and conventional in the existing art.

Figure 2:
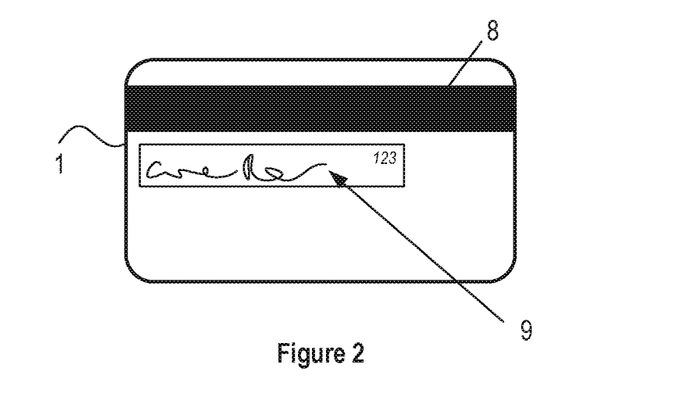
FIG. 2 schematically illustrates a rear side of the card shown in FIG. 1.

Reference is now made to FIG. 2, which schematically illustrates the back of card 1. As can be seen, the card 1 may include a magnetic stripe 8 encoded with information about the card as is known in the art. Furthermore, a signature block 9 may typically be provided. Note that in this example, the signature block 9 further includes a printed CSC, here exemplified by a 3-digit CVV2 code "123".

Figure 3:
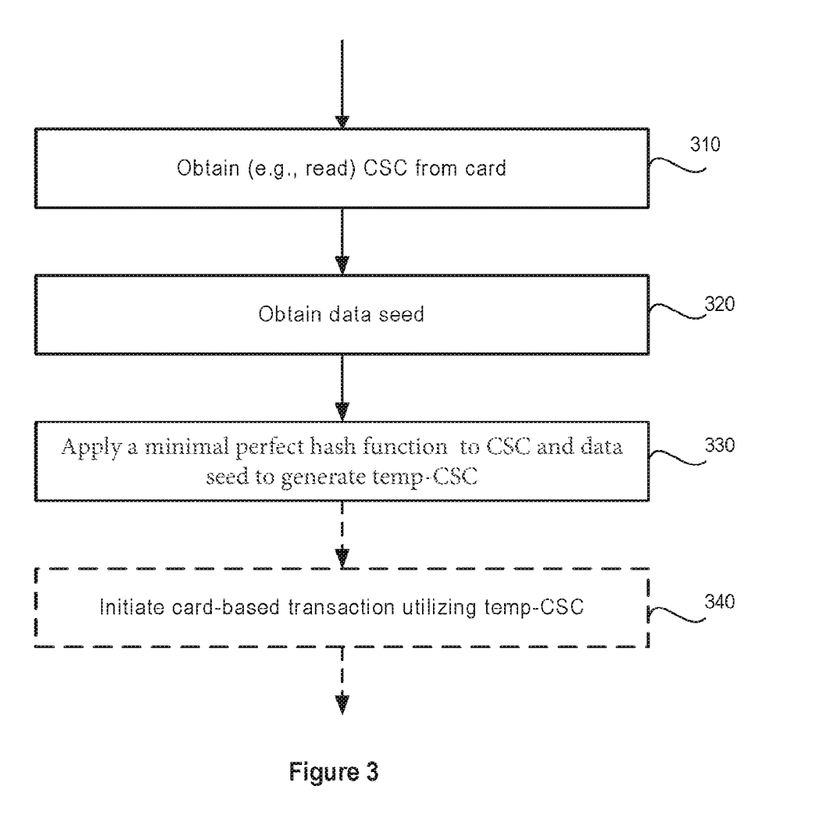
FIG. 3 is a flowchart illustrating method steps, or actions, in accordance with an embodiment of a method for generating a temporary CSC.

FIG. 3 is a flowchart that schematically illustrates a method of generating a temporary CSC {such as a CW or CW2) for use in a card based transaction. In the example detailed in FIG. 3, the method is performed by means of a mobile terminal, here exemplified as a mobile telephone.

Initially, the CSC is obtained 310 from the card 1. For example, this CSC may be obtained by reading the printed CSC from the card. In other words, the CSC may be obtained non-automatically, or manually, from the card 1. Alternatively, the CSC may be obtained automatically from the card 1. For example, in some embodiments the CSC may be optically read from the card 1.

Furthermore, a data seed is obtained 320. As will be appreciated, the data seed may include any one or a combination of the following attributes;
 a bank account number;
 an installation identifier (i.e., installation-ID);
 a mobile phone identifier such as an IMSI; and
 a time stamp.

In some embodiments, the data seed may comprise, or represent, an identifier which is common to a cardholder associated with the card 1 and a service provider system.

The data seed may be obtained 320 in different ways, e.g., depending on characteristics of the intended based transaction. In some embodiments, the data seed may be obtained in a way where the user (typically, but not necessarily, the cardholder) provides the data seed to the mobile terminal executing the method. Additionally, or alternatively, obtaining 320 the data seed may comprise receiving a signal including the data seed from the service provider system having one or several computer servers. For example, an installation-ID may be included in a signal received from the service provider system. Additionally, or alternatively, obtaining 320 the data seed comprises receiving a signal including the data seed from a card issuer system having one or several computer servers. For instance, a bank account number may be included in a signal received from the card issuer system. Additionally, or alternatively, obtaining 320 the data seed may comprise retrieving the data seed from a SIM associated with the mobile terminal. For example, an IMSI may be retrieved from said SIM.

With continued reference to FIG. 3A, a minimal perfect hash function is further applied 330 to the CSC as well as the data seed to generate a temporary CSC.

Figure 4A:
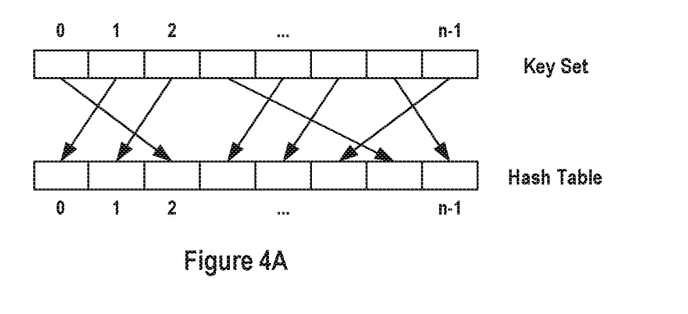
FIGS. 4A-4B schematically illustrate an example of a Minimal Perfect Hash (MPH) function.

Turning now to FIGS. 4A-4B and 5A-5C, an example of applying 330 a minimal perfect hash function to the CSC and the data seed will be described in more detail. FIG. 4A schematically illustrates an example minimal perfect hash function. Minimal perfect hash functions may avoid challenges of wasted space and time as is sometimes involved in other hash functions. Or said differently, each key in the key set has one and only one corresponding hashed key in the Hash Table. For example, assuming an application utilizing 3-digit CSC there will be 999 numbers in the Key Set and 999 corresponding numbers in the Hash Table. An example is given in FIG. 4B. In this example, there are 999 CSC's and 999 corresponding hashed CSC's, As can be seen, 0 renders 998, 1 renders 77, 2 renders 31, etcetera in this illustrative example.

Figure 4B:
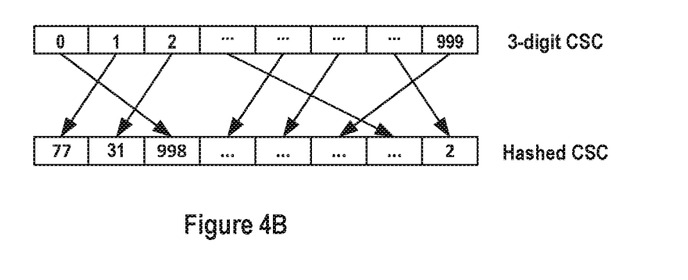

The exact hash function, or hash algorithm, to be used in a certain implementation or application may be arbitrarily, or randomly, determined or chosen. More specifically, the exact hash function, or hash algorithm, to be used in a certain implementation may be arbitrarily determined or chosen as long as it fulfills the requirements of a preferably non-order preserving, minimal perfect hash function. As will be appreciated, the exact hash function, or hash algorithm, to be used should also be tested and evaluated in dependence of user needs and system requirements for the intended card based transactions.

Figure 5A:
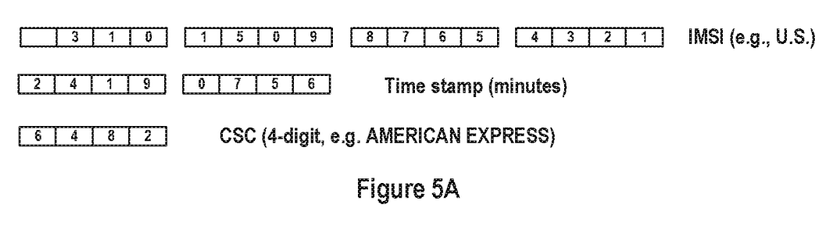
FIGS. 5A-5C schematically illustrate an application of an flan MPH function to a CSC as well as a data seed, in accordance with example embodiments.

Reference is now made to FIG. 5, which illustrates an example of applying 330 a minimal perfect hash function to a combination of the CSC and the data seed in accordance with some embodiments. In this example, the CSC is a 4-digit number, e.g. as used by AMERICAN EXPRESS. Also, in this example, the data seed comprises a combination of i) a mobile phone identifier, here exemplified by an IMSI; and ii) a time stamp. FIG. 5A illustrates the following:
 IMSI: 310 1509 8765 4321
 Time stamp: 2419 0756
 CSC: 6482.

As will be appreciated, the above-mentioned time stamp may be expressed in various ways. For example, it is possible to express the time using a time stamp as publicly available here: http://www.timestampconvert corn. That is, the timestamp, may use a system for describing points in time, defined as the number of seconds elapsed since midnight Coordinated Universal Time (UTC) of Jan. 1, 1970, not counting leap seconds. This way of expressing time is commonly used not only on Unix-like operating systems but also in many other computing systems.

Figure 5B:
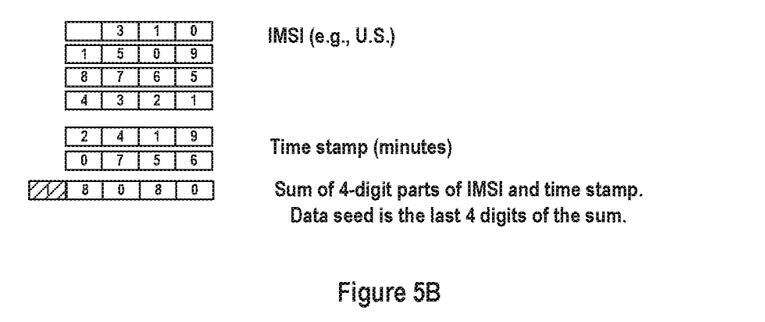

As can be seen in FIG. 5B, a data seed may be determined, or generated, from the IMSI and the time stamp. In this example, the data seed is generated as a total sum of the IMSI and the time stamp:

$$\begin{array}{r} 0310 \\ 1509 \\ 8765 \\ 4321 \\ 2419 \\ +\ 0756 \\ \hline 18080 \end{array}$$

As will be appreciated, the data seed corresponds to the last four digits of the total sum of the IMSI and the time stamp.

As will be appreciated, a minimal perfect hash function is also applied 330 to the CSC as well as the data seed to generate a temporary CSC. In some embodiments, as exemplified in FIG. 5C, it is possible to determine, or generate, a sum of the earlier-generated data seed and the CSC. Sometimes, this sum of the earlier-generated data seed and the CSC may be referred to as an intermediate key set.

Figure 5C:
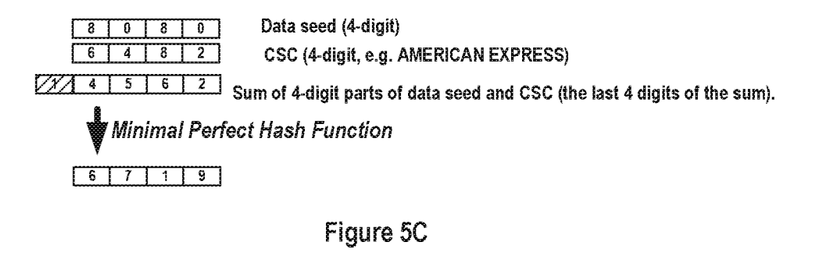

In this example, a total sum of the earlier-generated data seed and the CSC may be produced:

$$\begin{array}{r} 8080 \\ +\ 6482 \\ \hline 14562 \end{array}$$

The last four digits of the total sum of the earlier-generated data seed and the CSC form the intermediate key set 4562. As can be seen in FIG. 5C, applying 330 a minimal perfect hash function to the intermediate key set 4562 in this example may render, or generate, a temporary CSC 6719. The temporary CSC is sometimes denoted temp-CSC.

Again, it is worth mentioning that the exact hash function, or hash algorithm, to be used in action 330 in a certain implementation may be arbitrarily, or randomly, determined or chosen. More specifically, the exact hash function, or hash algorithm, to be used in a certain implementation may be arbitrarily determined or chosen as long as it fulfills the requirements of a preferably non-order preserving, minimal perfect hash function. As will be appreciated, the exact hash function, or hash algorithm, to be used should also be tested and evaluated in dependence of user needs and system requirements for the intended card based transactions. For example, the following webpage http://cmph.sourceforgemet/presents various publicly available hash functions that may be used in dependence of, for instance, user needs and system requirements (e.g., central processing unit (CPU) capacity and memory requirements). In some implementations, applications, or scenarios, it has turned out that the CHD function (abbreviation for Compress, Hash and Displace) may be advantageous. The CHD function is described in detail in the paper "Hash, displace, and compress" by Djamal Belazzougui, Fabiano C. Botelho, and Martin Dietzfelbinger, which can be downloaded at cmph.sourceforge.net/papers/esa09.pdf. Alternatively, it has turned out that Botelho Djamal Ziviani (BDZ) or the Botellho Menoti Ziviani (BMZ functions described at the webpage cmph.sourceforge.net/ may be suitable to apply.

With continued reference to FIG. 3, a card based transaction may optionally also be initiated utilizing the generated temporary CSC. For example, the card based transaction may be initiated between the mobile terminal performing the method steps, or actions, 310-330 and a service provider system.

In alternative embodiments, method steps (or, actions) 310-330 and method step (or, action) 340 are performed, or otherwise executed, by different devices in a distributed manner. For instance, the temporary CSC may initially be generated by a first device and the card-based transaction may be subsequently initiated by a second (i.e. different) device. In one example embodiment, the first device may e.g. be a temporary CSC generation device which is specifically designed for generating the temporary CSC. Once known, the temporary CSC generated by the first device may be utilized by a second device when initiating a card based transaction.

Figure 6:
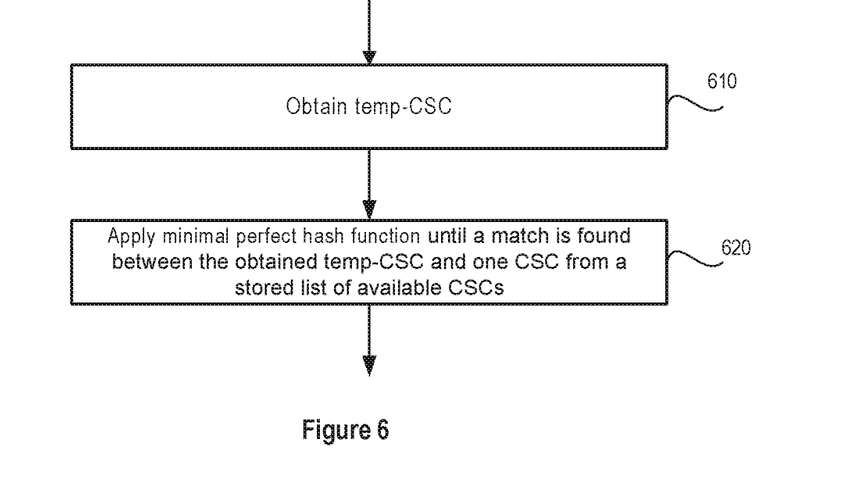
FIG. 6 is a flowchart illustrating method steps, or actions, in accordance with an embodiment of a method for verifying a temporary CSC.

Reference is now made to FIG. 6, which illustrates a flowchart that schematically illustrates a method of verifying a temporary CSC (such as a CVV or CVV2) used in a card based transaction. In the example detailed in FIG. 6, the method is performed by means of a service provider system including one or several computer servers. In alternative embodiments, the method may e.g. instead be performed by means of a credit issuer system including one or several computer servers.

As will be appreciated, the service provider system may comprise one single service provider server or several service provider servers. To this end, the expression service provider server is used to mean a computer server hosted by a service provider.

A temporary CSC is obtained 610. As described earlier with respect to FIG. 3, the temporary CSC has been generated by previously applying a minimal perfect hash function to a CSC as well as a data seed. For example, the temporary CSC may be obtained 610 by receiving the temporary CSC from a device, e.g. a mobile terminal, that has initiated a card based transaction with the service provider system.

Figure 7A:
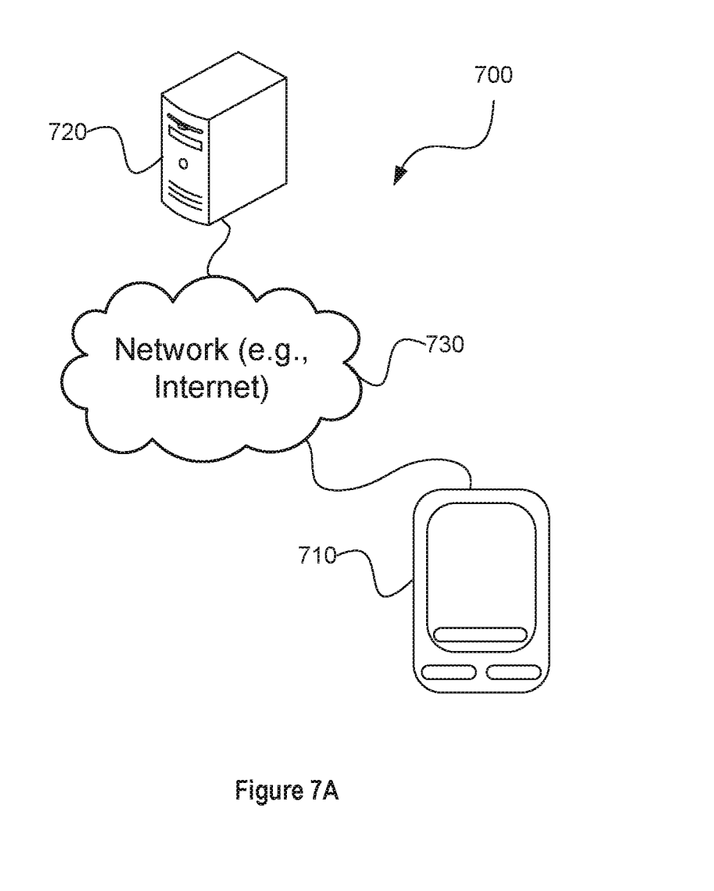
FIG. 7A is a block diagram of a system where embodiments described herein could be reduced to practice.

Furthermore, a same minimal perfect hash function is applied 620 to the temporary CSC until a match is found between the obtained temporary CSC and one CSC from a stored list of available CSCs. That is, the service provider system applies the same minimal perfect hash function as was previously used to generate the temporary CSC. Referring to FIG. 7A, the minimal perfect hash function to be used by the service provider system 720 (i.e., the same minimal perfect function) may for example be determined, e.g., stored, in advance at the service provider system 720. In other words, the minimal perfect hash function to be used may be known in advance by the service provider system 720. Alternatively, information related to the minimal perfect hash function may be communicated between the devices (i.e., the mobile terminal 710 and the service provider system 720), such as, during the initiation of the card based transaction.

Figure 7B:
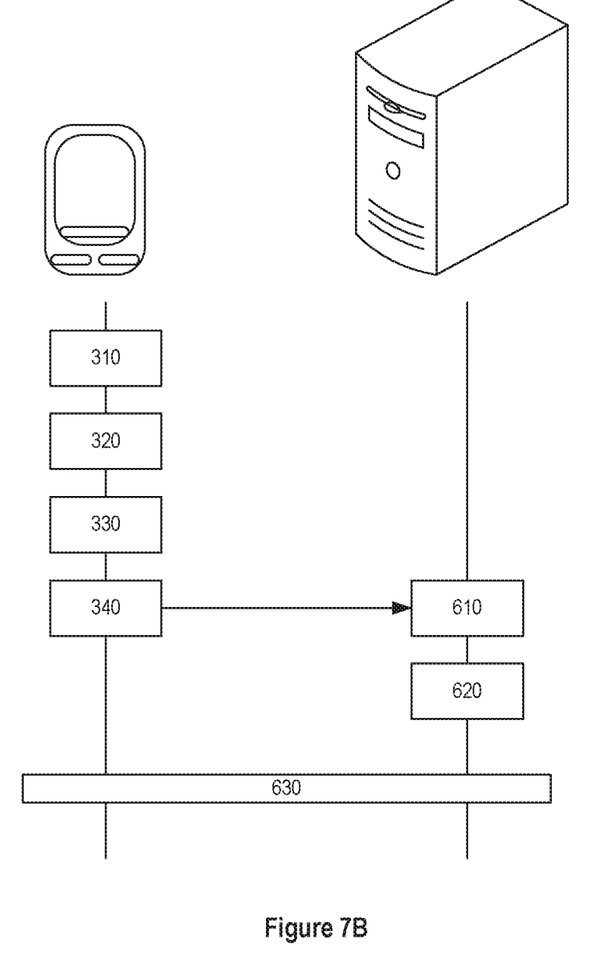
FIG. 7B is a signaling diagram schematically illustrating actions performed in the system of FIG. 7A, in accordance with some embodiments.

FIG. 7A schematically illustrates a system, wherein embodiments described hitherto may be applied. In this example scenario, the system 700 comprises a mobile terminal 710, such as a mobile telephone, and a service provider system 720, such as computer server hosted by a service provider. FIG. 7B is a signaling diagram illustrating various actions that may be performed as well as signaling between the mobile terminal 710 and the service provider system 720 shown in FIG. 7A.

The mobile terminal 710 may be connected through a network or other connection 730, in one example via the internet. The mobile terminal 710 may be connected through a wired connection or a wireless connection or any combination of known connection methods for example through dedicated networks or connections. It should be noted that any terminal may be connected to the network 730 and the number and type of terminals 710 in FIG. 7A should not be construed as limiting. The system 700 further comprises at least one server 720. In FIG. 7A only one server 720 is shown, but it should be noted that any number of servers 720 may be implemented in a computer network. Generally a server is a physical computer (a hardware system) dedicated to running one or more services (as a host), to serve the needs of users of other computers or terminals 710 on the network 730. In one embodiment the server 720 is a service provider server. Generally, a service provider server 720 may refer to either hardware (a computer) or software (a computer application) that helps to deliver content that can be accessed through a mutual communication network, such as the Internet 730.

FIG. 7B shows example actions and example messages that may be signaled between the mobile terminal 710 and the service provider system 720, as shown in FIG. 7A, to perform a card based transaction. As described earlier, the mobile terminal, here exemplified as a mobile telephone, obtains 310 a CSC such as a CVV or a CVV2 from a card, such as a credit card or a debit card. The mobile terminal further obtains 320 a data seed. Still further, the mobile terminal applies 330 a minimal perfect hash function to the CSC as well as the data seed to generate a temporary CSC. In this example, the mobile terminal also initiates 340, or otherwise triggers, a card based transaction with the service provider system 720 utilizing, or otherwise using, the generated temporary CSC. The service provider system 720 obtains 610 said temporary CSC. For example, the service provider system 720 may receive the temporary CSC from the mobile terminal. In response to obtaining 610 the temporary CSC, the service provider server may further apply the same minimal perfect hash function to the temporary CSC until a match is found between the obtained temporary CSC and one CSC from a stored list of available CSCs.

As will be appreciated, a temporary CSC may be generated at the mobile terminal 710. The temporary CSC is, as the name implies, valid only for a limited period of time. By also adding the application of a minimal perfect hash function to the original, or normal, CSC as well as a data seed as described in connection with FIGS. 7A-7B, it is made possible to generate the temporary CSC. The temporary CSC is generally more difficult to obtain fraudulently than a normal, or original, CSC. Since the temporary CSC is more difficult to obtain fraudulently, this temporary CSC may also be more secure to use in a subsequent card based transaction, such as a mobile purchase transaction with service provider system 720. Furthermore, by applying the same minimal perfect hash function to an obtained temporary CSC at the service provider system 720 until a match is found between the obtained temporary CSC and one CSC from a stored list of available CSCs, it is possible to verify the CSC without performing unnecessarily complex computations. In turn, this may allow for a relatively quick verification process.

Figure 8:
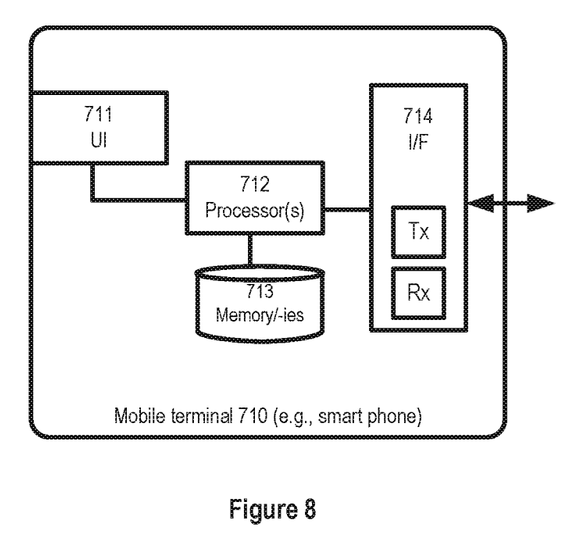
FIG. 8 shows an example implementation of an embodiment of a mobile terminal.

Reference is now made to FIG. 8 which schematically illustrates an example implementation of an embodiment of a mobile terminal 710 (see, e.g., also FIGS. 7A-7B). The mobile terminal 710 may, for example, be a mobile telephone, a tablet computer, a laptop computer, a desktop computer, or card terminal. The mobile terminal 710 may be configured to perform, or otherwise execute, the method in accordance with any one of the embodiments described herein, e.g. FIG. 3 or FIG. 7.

To this end, the mobile terminal 710 comprises a user interface (UI) 711. The mobile terminal 710 also comprises hardware resources. For example, the mobile terminal 710 may comprise one or more processors 712 and one or more memories 713. Also, a communications interface 714, or a communications circuitry, may be provided in order to allow the mobile terminal to communicate with other devices such as a service provider system 720. To this end, the communications interface 714 may comprise a transmitter (Tx) and a receiver (Rx). Alternatively, the communications interface 714 may comprise a transceiver (Tx/Rx) combining both transmission and reception capabilities. The communications interface 714 may include a radio frequency (RF) interface allowing the mobile terminal 710 to communicate with other mobile terminals and/or devices such as the service provider system 720 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

As will be appreciated, the mobile terminal 710 may hence comprise a UI 711, a communications interface I/F 714, one or more processors 712; and memory 713 storing instructions, executable by the one or more processors 712, whereby the mobile terminal 710 is operative to obtain a CSC from a card such as a credit card or a debit card, obtain a data seed, and apply a minimal perfect hash function to the CSC as well as the data seed to generate a temporary CSC.

The data seed may e.g. comprise any one or a combination of a bank account number, an installation identifier, a mobile phone identifier such as an IMSI and a time stamp.

The memory 713 may further store instructions, executable by the one or more processors 712, whereby the mobile terminal 710 is operable to initiate and optionally also complete a card based transaction with the service provider system utilizing the generated temporary CSC.

In some embodiments, obtaining the data seed comprises receiving a signal including the data seed from the service provider server.

In some embodiments, obtaining the data seed comprises receiving a signal including the data seed from a card issuer server.

In some embodiments, obtaining the data seed comprises retrieving the data seed from a SIM associated with a mobile terminal.

In some embodiments, obtaining the CSC from the card may comprise optically reading the CSC from the card.

Figure 9:
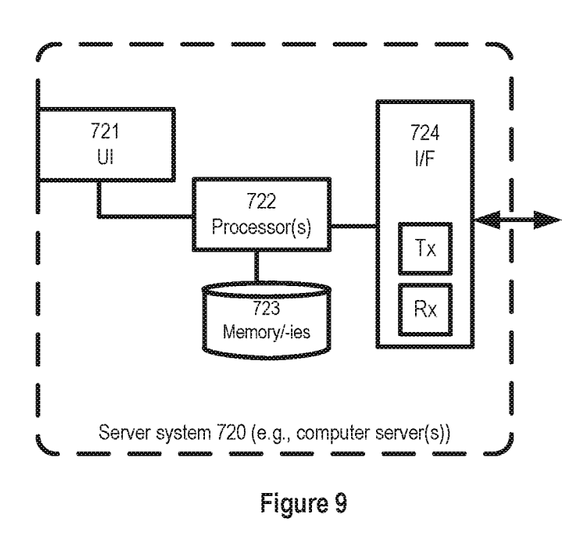
FIG. 9 shows an example implementation of an embodiment of a server system such as a service provider system.

Reference is now made to FIG. 9 which schematically illustrates an example implementation of an embodiment of a service provider system 720 (see, e.g., also FIGS. 7A-7B). The service provider system 720 may, for example, be a computer server hosted by a service provider as described earlier. The service provider system 720 may be configured to perform, or otherwise execute, the method in accordance with any one of the embodiments described herein, e.g. FIG. 6 or FIG. 7. To this end, the service provider system 720 may optionally comprise a UI 721. Furthermore, the service provider system 720 comprises hardware resources. For example, the service provider system 720 may comprise one or more processors 722 and one or more memories 723. Also, a communications interface 724, or a communications circuitry, may be provided in order to allow the service provider system 720 to communicate with other devices such as a mobile terminal 710. To this end, the communications interface 724 may comprise a transmitter (Tx) and a receiver (Rx). Alternatively, the communications interface 724 may comprise a transceiver (Tx/Rx) combining both transmission and reception capabilities. The communications interface 724 may include a radio frequency (RF) interface allowing the service provider system 720 to communicate with other computer servers and/or devices such as the mobile terminal 710 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Bluetooth®, etcetera.

As will be appreciated, the service provider system 720 may hence comprise a communications interface 724, one or more processors 722 and memory 723 storing instructions, executable by the one or more processors, whereby the service provider server 720 is operative to obtain a temporary CSC, wherein the temporary CSC has been generated by previously applying a minimal perfect hash function to the CSC as well as a data seed; and apply a same minimal perfect hash function to the temporary CSC until a match is found between the obtained temporary CSC and one CSC from a stored list of available CSCs.

Figure 10:
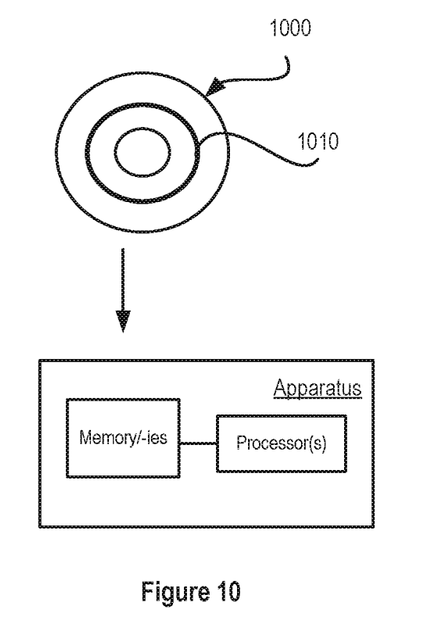
FIG. 10 illustrates a carrier comprising a computer program, in accordance with an embodiment.

Turning now to FIG. 10, another embodiment will be briefly discussed. FIG. 10 shows an example of a non-transitory computer-readable medium, in this example in the form of a data disc 1000. In one embodiment the data disc 1000 is a magnetic data storage disc. The data disc 1000 is configured to carry instructions 1010 that can be loaded into a memory of an apparatus, e.g. the mobile terminal 710. Upon execution of said instructions by a processor of the apparatus, the apparatus is caused to execute a method or procedure according to any one of the embodiments described herein, e.g. in conjunction with FIGS. 3 and 7. The data disc 1000 is arranged to be connected to or within and read by a reading device (not shown), for loading the instructions into the processor. One such example of a reading device in combination with one (or several) data disc(s) 1000 is a hard drive. It should be noted that the computer-readable medium can also be other mediums such as compact discs, flash memories or other memory technologies commonly used. In such an embodiment the data disc 1000 is one type of a tangible computer-readable medium. The instructions may alternatively be downloaded to a computer data reading device, such as an apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 11:
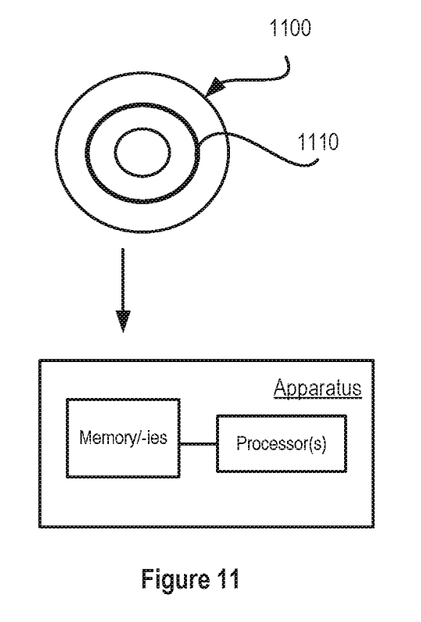
FIG. 11 illustrates a carrier comprising a computer program, in accordance with an embodiment.

Turning now to FIG. 11, another embodiment will be briefly discussed. FIG. 11 shows an example of a computer-readable medium, in this example in the form of a data disc 1100. In one embodiment the data disc 1100 is a magnetic data storage disc. The data disc 1100 is configured to carry instructions 1110 that can be loaded into a memory of an apparatus, e.g. a service provider system 720 including one or several computer servers. Upon execution of said instructions by a processor of the apparatus, the apparatus is caused to execute a method or procedure according to any one of the embodiments described herein, e.g. in conjunction with FIGS. 6 and 7. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, flash memories or other memory technologies commonly used. In such an embodiment the data disc 1100 is one type of a tangible computer-readable medium. The instructions may alternatively be downloaded to a computer data reading device, such as an apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Various Detailed Use Case Scenarios

In the following, certain detailed example implementations of the embodiments described hitherto will be described in some more detail in order to explain certain possible use case scenarios.

As described hereinabove, the various embodiments described herein enable the generation of a temporary CSC, which is, as the name implies, valid only for a limited period of time. Furthermore, the hashed temporary CSC is uniquely associated with the original, or normal, CSC. Compared to the original, or normal, CSC, the temporary CSC is more difficult to obtain fraudulently. For example, if a purchase transaction occurs online, then generally the CSC from the back of the card is required as an added security measure to reduce fraud. Nevertheless, this CSC could e.g. be obtained fraudulently by an entity, process, or individual which/who is wrongly in possession of the card. By also adding the application of a minimal perfect hash function to the original, or normal, CSC as well as a data seed, it is made possible to generate a temporary CSC which is more difficult to obtain fraudulently. Since the temporary CSC is more difficult to obtain fraudulently, this temporary CSC may also be more secure to use in a subsequent card based transaction, such as a mobile or on-line purchase transaction. Some embodiments described herein also enable the verification of the above-mentioned temporary CSC. By applying the same minimal perfect hash function to an obtained temporary CSC until a match is found between the obtained temporary CSC and one CSC from a stored list of available CSCs, it is possible to verify the CSC without performing unnecessarily complex computations. In turn, this may allow for a relatively quick verification process.

I. Mobile Payment Service Between User and a Service Provider (No Relation with Card Issuer)

In a first use case scenario, a user may download an application to his/her mobile terminal. An application is sometimes referred to as an 'app'. In the following, the application will therefore be referred to as the app. The app may e.g. be downloaded directly from a service provider, e.g. via an app store or similar (e.g., iTunes app store or Google Play app store).

To this end, the app may be downloaded to a mobile terminal 710 from service provider system 720. The downloaded app may include the minimal perfect hash function to be used by the downloading mobile terminal 710 in question. Once downloaded, this minimal perfect hash function is thus known by the mobile terminal 710 and the service provider system 720 that provided the app to the mobile terminal 710.

During the installation of the app, an installation-ID may optionally be created, or generated, for example using a sequence number or other number that is unique for the installation in question, Upon using the app, a CSC (e.g., CVV2), a time, an IMSI and optionally also the installation-ID may be used as input for the generation of a temporary CSC. The generation of the temporary CSC may be made in accordance with earlier-described embodiments (see e.g. FIG. 3 and FIG. 7).

It may also be possible to initiate a card based transaction with the service provider system using the app. For example, upon initiating a card based transaction using the app, the generated temporary CSC is utilized by the app. For instance, the temporary CSC, which is only valid for a predetermined period of time, may be transmitted, i.e. sent, to the service provider system.

Once the temporary CSC is obtained (e.g., received) by the service provider system 720, the service provider system 720 that knows the minimal perfect hash function communicated to the mobile terminal 710 can apply the same minimal perfect hash function to the temporary CSC until a match is found between the obtained temporary CSC and one CSC from a list of available CSCs stored at the service provider system 720. Once a match is found, the card based transaction can be continued until the transaction is completed. Experiments have shown that it is possible to verify the CSC this way without performing unnecessarily complex computations. In turn, this may allow for a relatively quick verification process.

II. Mobile Payment Service Between User and Service Provider (with Relation with Card Issuer)

In a second use case scenario, a user may download an application to his/her mobile terminal 710 from a service provider system 720. Prior to this app downloading, a credit issuer system (not shown) has provided the service provider system 720 with certain minimal perfect hash functions. Each of the minimal perfect hash functions provided to the service provider system 720 should advantageously be unique to a certain mobile terminal 710 downloading and using the app provided by the service provider system 720.

A downloaded app may hence include the minimal perfect hash function to be used by the downloading mobile terminal 710 in question. Once downloaded, this minimal perfect hash function is thus known by the mobile terminal 710 and credit issuer system that provided the minimal perfect hash function to the service provider system 720. In other words, it is not necessary that the service provider system 720 knows the minimal perfect hash function in this example. This may allow for improved security in certain card based transaction scenarios.

During the installation of the app at the mobile terminal 710, an installation-ID may optionally be created, or generated, for example using a sequence number or other number that is unique for the installation in question.

Upon using the app, a CSC (e.g., CVV2), a time, an IMSI and optionally also the installation-ID may be used as input for the generation of a temporary CSC. The generation of the temporary CSC may be made in accordance with earlier-described embodiments (see e.g. FIG. 3 and FIG. 7).

It may also be possible to initiate a card based transaction with the service provider system 720 using the app. For example, upon initiating a card based transaction using the app, the generated temporary CSC is utilized by the app. For instance, the temporary CSC, which is only valid for a predetermined period of time, may be transmitted, i.e. sent, to the service provider system 720.

Once the temporary CSC is obtained (e.g., received) by the service provider system 720, the service provider system 720 may forward the temporary CSC, possibly together with any other information related to the initiated transaction, to a credit issuer system (not shown). The credit issuer system may comprise one or several computer servers hosed by a credit issuer or credit institute. The minimal perfect hash function to be used when running, or otherwise using, the app may thus be known by the mobile terminal 710 and the credit issuer system. In this example, the credit issuer system that knows the minimal perfect hash function can apply the same minimal perfect hash function to the temporary CSC until a match is found between the obtained temporary CSC and one CSC from a list of available CSCs stored at the service provider system 720. Once a match is found by the credit issuer system, this information along with any other relevant information possibly relevant to the initiated transaction may be returned to the service provider system 720. Thereafter, the card based transaction may be continued between the mobile terminal 710 and the service provider system 720 until the transaction is completed. Experiments have shown that it is possible to verify the CSC this way without performing unnecessarily complex computations. In turn, this may allow for a relatively quick verification process.

Various embodiments described throughout this disclosure may enable the generation of a temporary CSC, which is, as the name implies, valid only for a limited period of time. Furthermore, the hashed temporary CSC is uniquely associated with the original, or normal, CSC. Compared to the original, or normal, CSC, the temporary CSC is generally more difficult to obtain fraudulently. For example, if a purchase transaction occurs online, then generally the CSC from the back of the card is required as an added security measure to reduce fraud. Nevertheless, this CSC could e.g. be obtained fraudulently by an entity, process, or individual which/who is wrongly in possession of the card. By also adding the application of a minimal perfect hash function to the original, or normal, CSC as well as a data seed, it is made possible to generate a temporary CSC which is generally more difficult to obtain fraudulently. Since the temporary CSC is more difficult to obtain fraudulently, this temporary CSC may also be more secure to use in a subsequent card based transaction, such as a mobile or on-line purchase transaction. Furthermore, various embodiments described throughout this disclosure enable the verification of the above-mentioned temporary CSC. By applying the same minimal perfect hash function to an obtained temporary CSC until a match is found between the obtained temporary CSC and one CSC from a stored list of available CSCs, it is possible to verify the CSC without performing unnecessarily complex computations. In turn, this may allow for a relatively quick verification process.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while the embodiments described herein have been exemplified to apply, or make use of, minimal perfect hash functions persons that are skilled in the art will appreciate that it is not necessary to apply, or make use of, minimal perfect hash functions. It will be envisaged that, in some applications or scenarios, other hash functions may alternatively be applied. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly, advantageously be combined, and the inclusion of different claims does not imply that a combination of features is not feasible and/or advantageous. In addition, singular references do not exclude a plurality.

The invention claimed is:

1. A method of generating a temporary Card Security Code (CSC) via a mobile terminal comprising a memory and a processor, the method comprising the steps of:
obtaining a CSC from a card by reading the CSC from the card using the mobile terminal;
obtaining, using the mobile terminal, a data seed, by summing a time stamp and one or more of a bank account number, an installation identifier, or a mobile terminal identifier of the mobile terminal;
generating, using the mobile terminal, a total sum of the data seed and the CSC;
generating, using the mobile terminal, a temporary CSC by applying a minimal perfect hash function to the generated total sum; and
initiating with the mobile terminal a card based transaction utilizing the generated temporary CSC.

2. The method of claim 1, wherein the mobile terminal identifier is a mobile phone identifier.

3. The method of claim 2, wherein the mobile phone identifier includes an International Mobile Subscriber Identity (IMSI).

4. The method of claim 1, wherein initiating with the mobile terminal the card based transaction utilizing the generated temporary CSC comprises initiating with the mobile terminal the card based transaction with a service provider system having one or several computer servers utilizing the generated temporary CSC.

5. The method of claim 1, wherein the data seed comprises an identifier which is common to a cardholder associated with said card and a service provider system.

6. The method of claim 1, wherein obtaining, using the mobile terminal, the data seed comprises receiving a signal including the data seed from a service provider system.

7. The method of claim 1, wherein obtaining, using the mobile terminal, the data seed comprises receiving a signal including the data seed from a card issuer server.

8. The method of claim 1, wherein obtaining, using the mobile terminal, the data seed comprises retrieving the data seed from a Subscriber Identity Module (SIM) associated with the mobile terminal.

9. The method of claim 1, wherein obtaining the CSC from the card by reading the CSC from the card using the mobile terminal comprises obtaining the CSC from the card by optically reading the CSC from the card.

10. The method of claim 1, wherein the mobile terminal is a device selected from a group comprising: a mobile telephone, a tablet computer, a laptop computer, a desktop computer, and a card terminal.

11. A non-transitory computer-readable medium comprising executable instructions for generating a temporary Card Security Code (CSC) using a mobile terminal, wherein the instructions, when executed by one or more processors of the mobile terminal, cause the mobile terminal to:
obtain a CSC from a card by reading the CSC from the card;
obtain a data seed by summing a time stamp and one or more of a bank account number, an installation identifier, or a mobile terminal identifier of the mobile terminal;
generate a total sum of the data seed and the CSC;
generate a temporary CSC by applying a minimal perfect hash function to the generated total sum; and
initiate a card based transaction utilizing the generated temporary CSC.

12. The method of claim 1, wherein the card is a credit card or a debit card.

13. A mobile terminal, comprising:
a user interface;
a communications interface;
one or more processors; and
a memory storing executable instructions that when executed by the one or more processors cause the mobile terminal to perform the steps of:
obtaining a Card Security Code (CSC) from a card by reading the CSC from the card;
obtaining a data seed by summing a time stamp and one or more of a bank account number, an installation identifier, or a mobile terminal identifier of the mobile terminal;
generating a total sum of the data seed and the CSC;
generating a temporary CSC by applying a minimal perfect hash function to the generated total sum; and
initiating a card based transaction utilizing the generated temporary CSC.

14. The mobile terminal of claim 13, wherein the mobile terminal is a device selected from a group comprising: a mobile telephone, a tablet computer, a laptop computer, a desktop computer, and a card terminal.

15. The mobile terminal of claim 13, wherein the mobile terminal identifier is a mobile phone identifier.

16. The mobile terminal of claim 15, wherein the mobile phone identifier includes an International Mobile Subscriber Identity (IMSI).

17. The mobile terminal of claim 13, wherein to initiate the card based transaction utilizing the generated temporary CSC, the memory stores further executable instructions that when executed by the one or more processors further cause the mobile terminal to perform the step of initiating the card based transaction with a service provider system utilizing the generated temporary CSC.

18. The mobile terminal of claim 13, wherein the data seed comprises an identifier which is common to a cardholder associated with said card and a service provider system.

19. The mobile terminal of claim 13, wherein the card is a credit card or a debit card.

20. The non-transitory computer-readable medium of claim 11, wherein, to initiate the card based transaction utilizing the generated temporary CSC, the memory stores further executable instructions that, when executed by the one or more processors, further cause the mobile terminal to initiate the card based transaction utilizing the generated temporary CSC with a service provider system having one or several computer servers.

* * * * *